US012403342B2

(12) United States Patent
Murray

(10) Patent No.: US 12,403,342 B2
(45) Date of Patent: Sep. 2, 2025

(54) FIRE PROTECTION AND SUPPRESSION APPARATUS, MATERIALS, SYSTEMS AND METHODS OF USE THEREOF

(71) Applicant: Donald A. Murray, Green Bay, WI (US)

(72) Inventor: Donald A. Murray, Green Bay, WI (US)

( * ) Notice: Subject to any disclaimer, the term of this patent is extended or adjusted under 35 U.S.C. 154(b) by 794 days.

(21) Appl. No.: 17/638,563

(22) PCT Filed: Aug. 21, 2020

(86) PCT No.: PCT/US2020/047527
§ 371 (c)(1),
(2) Date: Feb. 25, 2022

(87) PCT Pub. No.: WO2021/041263
PCT Pub. Date: Mar. 4, 2021

(65) Prior Publication Data

US 2022/0288435 A1 Sep. 15, 2022

Related U.S. Application Data

(60) Provisional application No. 63/004,828, filed on Apr. 3, 2020, provisional application No. 62/891,707, filed on Aug. 26, 2019.

(51) Int. Cl.
*A62C 35/10* (2006.01)
*A62C 37/40* (2006.01)
(Continued)

(52) U.S. Cl.
CPC .............. *A62C 35/10* (2013.01); *A62C 37/40* (2013.01); *A62C 37/48* (2013.01); *A62C 99/0018* (2013.01); *A62C 3/16* (2013.01)

(58) Field of Classification Search
CPC ......... A62C 35/10; A62C 37/40; A62C 37/48; A62C 8/06; A62C 99/0018; A62C 5/006; A62C 3/16; A62D 1/06
See application file for complete search history.

(56) References Cited

U.S. PATENT DOCUMENTS 3,711,115 A 1/1973 Lohr
3,782,475 A 1/1974 Schmidt
(Continued)

FOREIGN PATENT DOCUMENTS

CN 108578945 A 9/2018
CN 109256502 A 1/2019
(Continued)

*Primary Examiner* — Christopher R Dandridge
(74) *Attorney, Agent, or Firm* — Douglas B Teaney; CARDINAL LAW Group

(57) ABSTRACT

Fire protection and suppression apparatus, materials, systems and methods of use thereof are disclosed. In fire extinguishing applications, a convergent-divergent nozzle is incorporated into a pyrotechnic aerosol generator to improve the discharge characteristics when combined with air induction, reduced quantity of cooling media, and re-shaped agent/combustion chamber for longer discharge duration. In fire extinguishing applications, aerosol extinguishing agent in sheets, panels or other forms can be placed inside an enclosure that may have a fire. Once initiated, the aerosol extinguishing material will burn to create and directly disperse the aerosol particulate that can extinguish the fire. Initiation of the aerosol agent can be by flames or heat from an unwanted fire. Alternative methods of initiation include electric initiators that are signaled by automatic fire detection systems, electric manual methods, or mechanical/thermal initiators.

21 Claims, 6 Drawing Sheets

(51) Int. Cl.

| | |
|---|---|
| ***A62C 37/48*** | (2006.01) |
| ***A62C 99/00*** | (2010.01) |
| *A62C 3/16* | (2006.01) |

(56) References Cited

U.S. PATENT DOCUMENTS

| | | | |
|---|---|---|---|
| 5,492,180 A | 2/1996 | Spector et al. | |
| 5,857,627 A | 1/1999 | Horwell et al. | |
| 6,983,805 B2 * | 1/2006 | Chattaway | A62C 8/06 169/36 |
| 7,337,856 B2 * | 3/2008 | Lund | A62C 99/0018 169/44 |
| 8,844,644 B2 | 9/2014 | Guo et al. | |
| 10,864,395 B2 | 12/2020 | Murray et al. | |
| 2004/0262017 A1 | 12/2004 | Gaidano et al. | |
| 2010/0032501 A1 | 2/2010 | Tarnogrodzki et al. | |
| 2010/0139931 A1 * | 6/2010 | Guenthner | A62C 2/065 169/48 |
| 2011/0036600 A1 | 2/2011 | Zhang et al. | |
| 2011/0226492 A1 | 9/2011 | Tagliareni et al. | |
| 2012/0034482 A1 | 2/2012 | Zeliff | |
| 2012/0285710 A1 * | 11/2012 | Umehara | A62C 5/006 169/56 |
| 2013/0134233 A1 | 5/2013 | Woo et al. | |
| 2013/0292140 A1 | 11/2013 | Inoue et al. | |
| 2014/0196916 A1 | 7/2014 | Lee et al. | |
| 2015/0017491 A1 | 1/2015 | Specht et al. | |
| 2016/0107010 A1 | 4/2016 | Cordani | |
| 2016/0346577 A1 * | 12/2016 | Ito | A62C 5/006 |
| 2017/0113080 A1 | 4/2017 | Specht et al. | |
| 2018/0087272 A1 | 3/2018 | Vandemark et al. | |

FOREIGN PATENT DOCUMENTS

| | | |
|---|---|---|
| CN | 107670206 A | 12/2022 |
| EP | 0569025 81 | 7/1993 |
| JP | H06 269513 A | 9/1994 |
| JP | 2011062340 A | 3/2011 |
| JP | 2019033123 A | 2/2019 |
| RU | 53921 U | 10/2006 |
| WO | WO93315793 | 8/1993 |
| WO | WO 2011/161792 A1 | 12/2011 |
| WO | WO2018071309 A1 | 4/2018 |

* cited by examiner

TYPICAL ENCLOSURE

AEROSOL SHEETS, PANEL OR COATING INSTALLED

AEROSOL EXTINGUISHING AGENT CAN BE IN DIFFERENT FORMATS AND PLACEMENTS

AGENT CAN BE SUPPLEMENTED WITH ELECTRIC DETECTION FOR AUTOMATIC ACTUATION

FIRE PROTECTION AND SUPPRESSION APPARATUS, MATERIALS, SYSTEMS AND METHODS OF USE THEREOF

RELATED APPLICATIONS AND PRIORITY CLAIM

This application claims priority of the filing dates of, and hereby expressly incorporates by reference the complete disclosures of, U.S. Ser. No. 62/891,707, filed 26 Aug. 2019; and U.S. Ser. No. 63/004,828, filed 3 Apr. 2020.

TECHNICAL FIELD

The invention relates to fire protection and suppression apparatus, materials, systems, and methods of use thereof, for use in compartments and enclosures, amongst other locations. The invention also relates, in part, to an aerosol generator with a convergent-divergent nozzle and additional features to improve the discharge.

More particularly, the invention relates to an aerosol generator with a convergent-divergent nozzle with added features such as air induction for added cooling, and/or a reduced quantity of cooling media, and/or an elongated agent and combustion chamber, used in a fire extinguishing system.

The invention also relates, in part, to employing an aerosol fire extinguishing agent in a simplified installation that simplifies the installation, reduces space requirements, reduces weight and saves cost on both the extinguishing components and the installation.

More particularly, the invention relates, in part, to a solid aerosol fire extinguishing agent which may be formed in panels, sheets or various regular or irregular geometric solids, or as a coating so that it can be employed in compartments or enclosures without the need for significant housings or containers.

BACKGROUND OF THE INVENTION

In early 1990's, it was found that pyrotechnically generated aerosol agents (also known as condensed aerosol agents) were effective in extinguishing fire. These systems can be used in place of other extinguishing systems for land, marine/naval, vehicle, rail and aviation applications.

The agent is created in a container by initiating the combustion of an energetic solid to a hot vapor with the resulting hot gaseous/particulate material discharged into the area of the fire.

To cool the discharge and to prevent the ejection of flame, a heat absorbing solid material and screening is commonly installed in the container in the discharge pathway.

The use of heat absorbing material and/or screening has disadvantages:

Production of "slag"—The initial cooling of the hot agent (vapor, particulate and gases) causes condensation of the initial agent to a hot liquid that can drip from the generator and potentially damage anything under the generator that is vulnerable to the hot dripping liquid. The high heat of the hot agent (vapor, particulate and gases) causes significant temperature shock to the heat absorbing material and the outer layers of the solid material heats rapidly and faster than the inner layers resulting in thermal stress that can fracture the solid cooling material. This fracturing produces small chips of the very hot solid material that can be discharged or "spit-out" of the generator. The dripping and spitting are sometimes referred to as "slag". This "slag' can result in damage, contamination and the need for clean-up in the fire area that is being protected by the extinguishing system. Some occupancies, such as computer or server rooms, are more susceptible to damage from the slag and the need for clean-up than a room that would contain a diesel engine.

Reduction in the momentum of the discharge—To be an effective extinguishing system, the discharge from the generators must be effective in filling a compartment. This is best accomplished with the agent having significant momentum upon discharge to create mixing with the air in the protected space. The cooling materials and/or the screens can obstruct the discharge thus reducing the momentum and making the generators less effective.

Discharge durations that are too brief for complete mixing of the discharged agent into the protected enclosure—The present pyrotechnic generators commonly have discharge times of 30 seconds or less, even though the fire protection regulations allow up to 60 seconds, or up to 120 seconds for marine applications. It is desirable to have a longer discharge time combined increased momentum to provide superior mixing of the agent in the room or other enclosure.

In present aerosol systems, the agent is created in a container by initiating the combustion of an energetic solid to a hot vapor with the resulting hot gaseous/particulate material discharged into the area of the fire. To cool the discharge and to prevent the ejection of flame, a heat absorbing solid material and screening is commonly installed in the container in the discharge pathway.

There have been thin metal panels containing dry chemical extinguishing powders placed around fuel tanks of automobiles so that if the vehicle is rear-ended, with the possibility that the fuel tank is ruptured, the panels containing the extinguishing agent will also be ruptured thus dispersing the dry powder agent to prevent or extinguish fire. Some of the Ford Crown Victoria police vehicles have had these dry chemical agent panels installed with successful fire suppression in both testing and actual accidents. The US military has also installed similar panels on armored vehicles to protect wheel-wells, etc. Aerosol agents have not been used in these applications.

SUMMARY OF THE INVENTION

The invention comprises, in part, a fire suppression system comprising an aerosol material disposed on, or in physical proximity to, a potential fire hazard, wherein the aerosol material is configured to be actuated by exposure to at least one of heat or flame, and wherein the aerosol material is in the form of at least one of: a body of material impregnated with an aerosol fire suppression substance; a coating applied to a surface on, or in physical proximity to, the potential fire hazard. In an embodiment of the invention, the body of material is one of flexible, rigid, a combination thereof; and has a shape that is one of a cylinder, a pyramid, a prism, a rectangular parallelepiped, a sphere, an irregular shell, a combination thereof; and is one of hollow, solid-through, solid but porous throughout; a combination thereof.

In an embodiment of the invention, the aerosol fire suppression substance comprises at least one of potassium nitrate; potassium carbonate; epoxies or organic resins; dicyandiamide (DCDA); magnesium.

In an embodiment, the aerosol material further comprises a plurality of layers of aerosol fire suppression substance. The plurality of layers may comprise at least two layers, and further wherein the aerosol fire suppression substance of a first layer is different from an aerosol fire suppression substance of a second layer.

In an embodiment, the fire suppression system further comprises an initiator operably coupled to the aerosol material to facilitate actuation of the aerosol fire suppression substance.

In an embodiment, the fire suppression system further comprises a fire detector operably coupled to the initiator, to actuate the initiator, upon detection of at least one of heat in excess of a predetermined temperature, flame, combustion products in excess of a predetermined concentration, combustion products having at least predetermined constituent.

In an embodiment, the fire suppression system further comprises a control apparatus coupled to the initiator and the aerosol material.

In an embodiment, the control apparatus comprises a manual actuator to enable the initiator to be selectively actuated by a person.

In an embodiment, the fire suppression system further comprises a fire detector operably coupled to the initiator, and the control apparatus, to actuate the initiator, upon detection of at least one of heat in excess of a predetermined temperature, flame, combustion products in excess of a predetermined concentration, combustion products having at least predetermined constituent. In an embodiment of the invention, the fire hazard comprises at least one of a device and a process system, and the control apparatus is coupled to a monitoring apparatus that monitors operation of the device. Such a device could be a battery or bank of batteries in a vehicle or a facility. Alternatively, the process system could be any type of manufacturing or operational system, wherein the risk of fire is particularly salient.

The present invention also comprises in part, a fire suppression system, comprising at least one of an aerosol material disposed on, or in physical proximity to, a potential fire hazard, wherein the aerosol material is configured to be actuated by exposure to at least one of heat or flame, and further wherein the aerosol material is in the form of at least one of a flexible sheet impregnated with an aerosol fire suppression substance, a rigid sheet, impregnated with an aerosol fire suppression substance, a coating applied to a surface on, or in physical proximity to, the potential fire hazard; and/or a pyrotechnic generator, which upon actuation, produces fire suppression agent, the pyrotechnic generator including a combustion chamber having an outlet; and at least one convergent-divergent nozzle coupled directly to the outlet of the combustion chamber, the nozzle disposed so as to direct the fire suppression agent at the potential fire hazard or to be very effective in flooding a compartment or enclosure with the fire suppressing agent.

The present disclosure also comprises, in an embodiment, a fire suppression apparatus. A pyrotechnic generator, which upon actuation, produces fire suppression agent, the pyrotechnic generator including a combustion chamber having an outlet. At least one convergent-divergent nozzle is coupled directly to the outlet of the combustion chamber.

In an embodiment, an air induction shell is coupled to the pyrotechnic generator and surrounding the at least one convergent-divergent nozzle. The air induction shell has at least one aperture therein, through which surrounding environmental air is educted and entrained in a discharge flow emanating from the at least one convergent-divergent nozzle.

In an embodiment, at least one cooling medium is disposed downstream from an outlet of the at least one convergent-divergent nozzle.

In an embodiment, a screen is disposed downstream from an outlet of the at least one convergent-divergent nozzle.

In an embodiment, the at least one convergent-divergent nozzle further comprises a plurality of convergent-divergent nozzles. In an embodiment, the convergent-divergent nozzles are disposed in a direction parallel to an axis of a discharge outlet of the pyrotechnic generator and project their collective discharges in a substantially axial direction, substantially parallel to one another. In an alternative embodiment, the convergent-divergent nozzles are disposed circumferentially about an axis of a discharge outlet of the pyrotechnic generator and extend radially outwardly therefrom, and project their respective discharges radially relative to the axis. In another embodiment, at least one convergent-divergent nozzle is disposed in a direction parallel to an axis of a discharge outlet of the pyrotechnic generator and projects its discharge in a substantially axial direction, substantially parallel to one another, and at least one convergent-divergent nozzle is disposed so that it extends radially outwardly from an axis of the discharge outlet, and projects its discharge radially relative to the axis. In an alternative embodiment, the convergent-divergent nozzles are disposed in at least one of a direction parallel to an axis of a discharge outlet of the pyrotechnic generator and project their collective discharges in a substantially axial direction, substantially parallel to one another, and circumferentially about an axis of a discharge outlet of the pyrotechnic generator and extend radially outwardly therefrom, and project their respective discharges radially relative to the axis.

The aforementioned and other features and advantages of the invention will become further apparent from the following detailed description of the presently preferred embodiments, read in conjunction with the accompanying drawings, which are not to scale. The detailed description and drawings are merely illustrative of the invention, rather than limiting, the scope of the invention being defined by the appended claims and equivalents thereof.

DETAILED DESCRIPTION OF THE DRAWINGS

Figure 1:
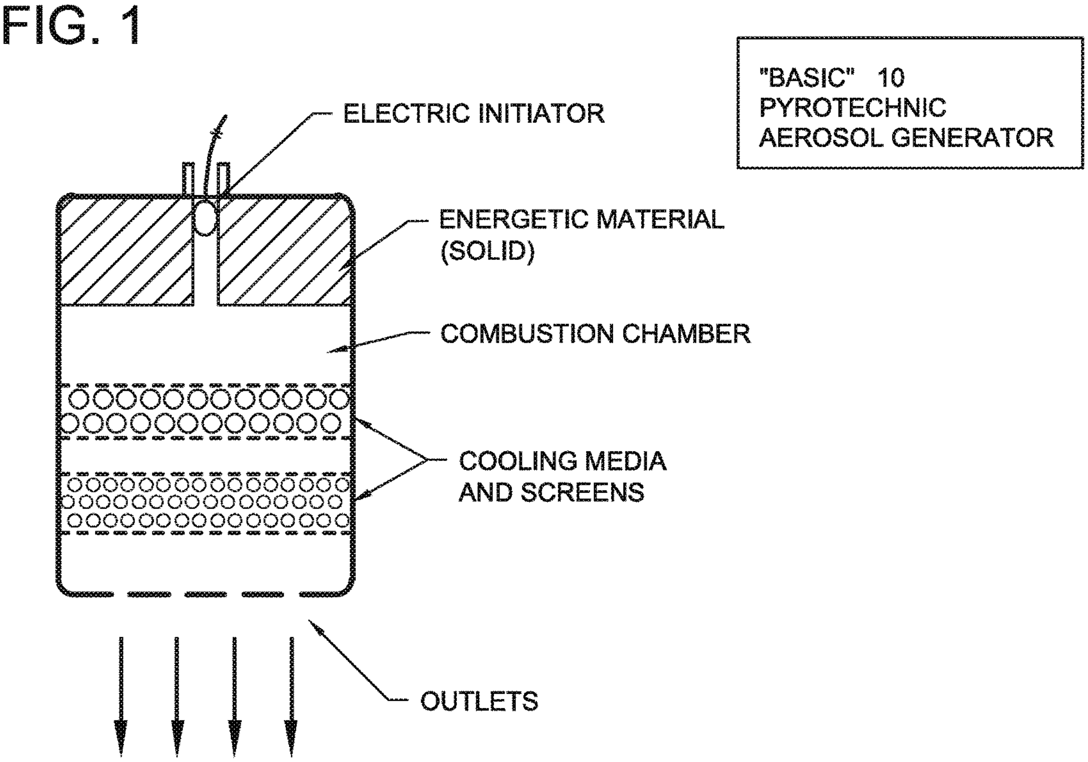
FIG. 1 is a simplified side sectional view of a pyrotechnic generator according to a known configuration.

While this invention is susceptible of embodiment in many different forms, there are shown in the drawings and described in detail herein, specific embodiments, with the understanding that the present disclosure is to be considered as an exemplification of the principles of the invention, and is not intended to limit the invention to the embodiment(s) illustrated.

The invention and accompanying drawings will now be discussed in reference to the numerals provided therein to enable one skilled in the art to practice the present invention. The drawings and descriptions are exemplary of various aspects of the invention and are not intended to narrow the scope of the appended claims. Unless specifically noted, it is intended that the words and phrases in the specification and the claims be given their plain, ordinary and accustomed meaning to those of ordinary skill in the applicable arts. It is noted that the inventors can be their own lexicographers. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f) or pre-AIA 35 U.S.C. § 112~6. Thus, the use of the words "function," "means" or "step" in the Detailed Description of the Invention or claims is not intended to somehow indicate a desire to invoke the special provisions of 35 U.S.C. § 112(f) or pre-AIA 35 U.S.C. § 112~6 to define the invention. To the contrary, if the provisions of 35 U.S.C. § 112(f) or pre-AIA 35 U.S.C. § 112~6 are sought to be invoked to define the inventions, the claims will specifically and expressly state the exact phrases "means for" or "step for" and the specific function (e.g., "means for roasting"), without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112(f) or pre-AIA 35 U.S.C. § 112~6. Moreover, even if the provisions of 35 U.S.C. § 112(f) or pre-AIA 35 U.S.C. § 112~6 are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and apparatus are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, apparatus and technologies to which the disclosed inventions may be applied. Thus, the full scope of the inventions is not limited to the examples that are described below.

Various aspects of the present invention may be described in terms of functional block components and various processing steps. Such functional blocks may be realized by any number of hardware or software components configured to perform the specified functions and achieve the various results.

Various representative implementations of the present invention may be applied to any system involving pyrotechnics-based fire suppression. Thus, while there are disclosed improved apparatus, systems, and methods for effectuating the generation and dispersion of pyrotechnically-generated fire suppression substances, it will be understood that references in the following disclosure to systems and apparatus are also applicable to other fire suppression apparatuses and methods, which utilize related structures for the processes recited. Similarly, references to methods are also applicable of systems and apparatus, which perform the processes in the operation of the recited apparatus. It will be appreciated that numerous changes may be made to the present invention without departing from the scope of the claims, including but not limited to combinations of elements or structures of the various illustrated embodiments. For example, while specific materials and/or methods of manufacture of the apparatuses described herein may be discussed, it is understood that one having ordinary skill in the art may select different materials and/or methods of manufacture, as desired or necessary to meet the requirements of a particular application, without departing from the scope of the present invention.

FIG. 1 is a simplified side sectional view of a pyrotechnic aerosol generator 10, according to a known configuration. The fire suppression agent discharge is slowed due to the cooling media and screens. The initial agent vapor cools to a liquid as it encounters the cooling media and drips out of the generator after the generator finishes its burn. Due to thermal shock, the hot vapor inside the generator frequently fractures the cooling media which is then spit out as very hot cracked material causing damage. It is believed that generator 10 is typically employed in a fire suppression system, wherein a cooling media is disposed between the generator 10 and an ultimate dispersion nozzle.

Figure 2:
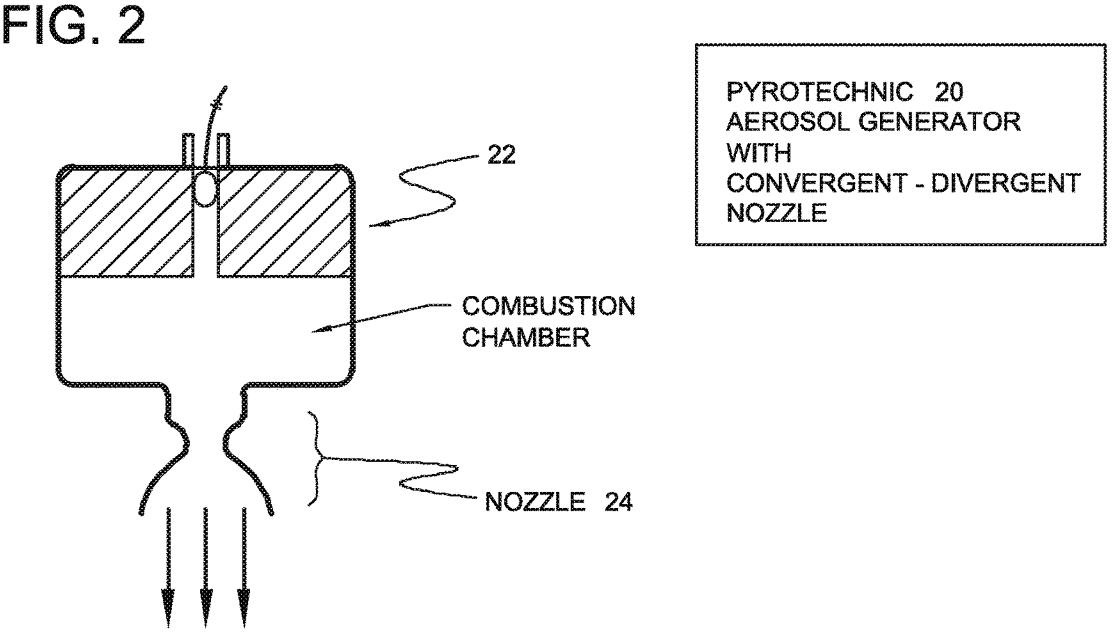
FIG. 2 is a simplified side sectional view of a fire suppression apparatus comprising a pyrotechnic generator provided with a convergent-divergent nozzle according to an embodiment of the invention.

FIG. 2 is a simplified side sectional view of a fire suppression apparatus 20, having a pyrotechnic generator 22 with a convergent-divergent ("C-D") nozzle 24, according to an embodiment of the invention. It is to be noted that the products of combustion from the pyrotechnic generator are conducted directly into the C-D nozzle 24, without any intervening cooling media or other structures. In general, convergent-divergent nozzles are known to provide: increased momentum to the discharge; cooler discharge; and lower pressures. This is because energy of the temperature and pressure is converted into momentum. Improvements in reducing "slag", cooling the discharge, increasing the momentum and duration of the discharge are believed to result from added features and design changes that take advantage of the results of using a convergent-divergent nozzle with the generator.

Figure 3:
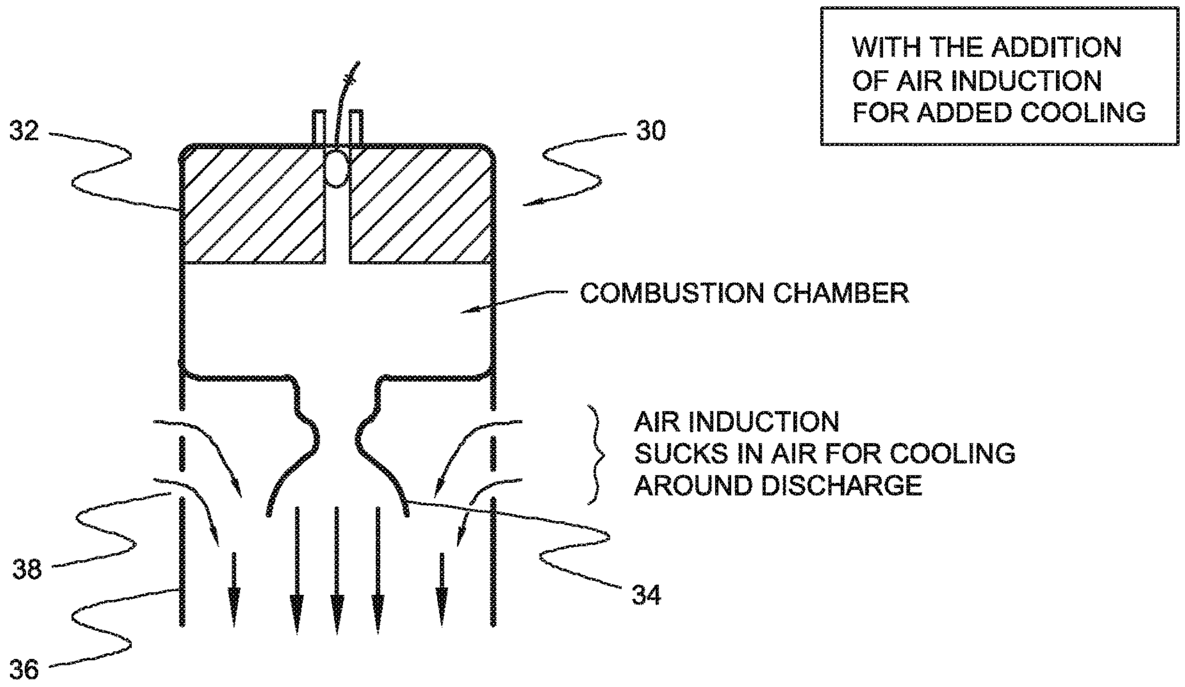
FIG. 3 is a simplified side sectional view of a fire suppression apparatus comprising a pyrotechnic generator with convergent-divergent nozzle, further including air eduction structural features, according to an embodiment of the invention.

FIG. 3 is a simplified side sectional view of a fire suppression apparatus 30, according to an embodiment of the invention, comprising a pyrotechnic generator 32, having a C-D nozzle 34 coupled directly to the exit therefrom. Operatively coupled to pyrotechnic generator 30, and surrounding C-D nozzle 34 is a shell or duct 36 having a plurality of inlets 38 disposed therein. During operation of generator 32, environmental air is drawn through inlets 38 and entrained in the flow of the combustion products exiting C-D nozzle 34. The increased momentum of the discharge with the convergent-divergent nozzle allows the induction of exterior air to further cool the discharge. In addition to improved cooling of the discharging agent, it is believed this will result results in a lowering of any requirement for solid (or other) cooling media which, in turn, reduces the creation of slag, and offers less flow resistance to the discharge of the fire suppression agent.

Figure 4:
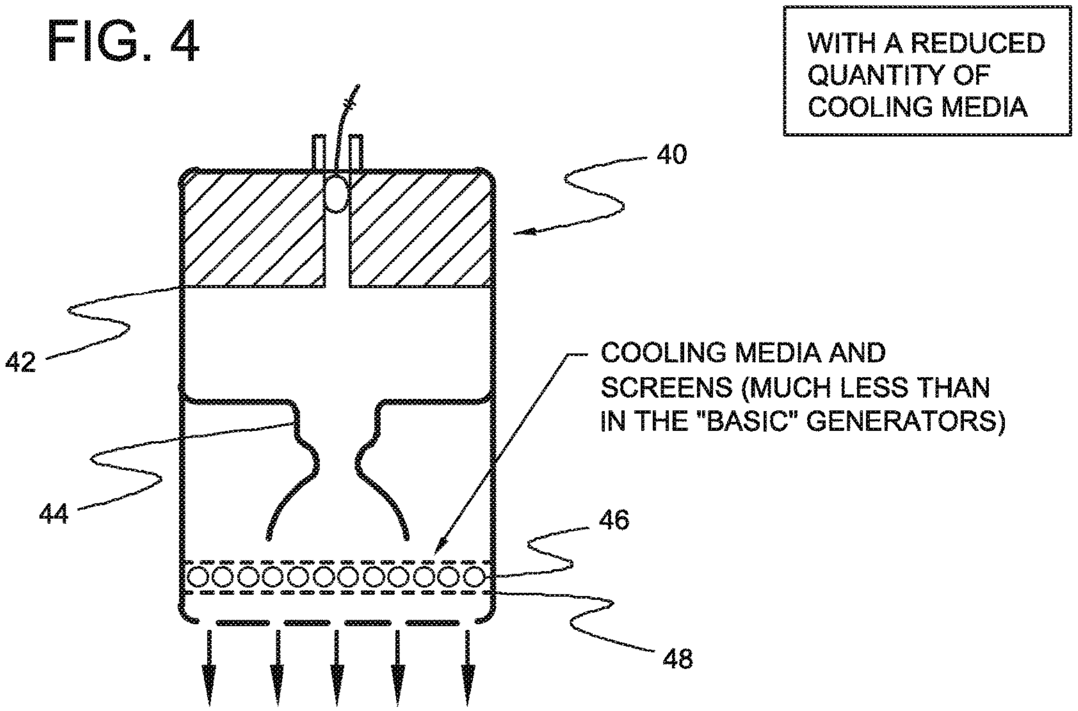
FIG. 4 is a simplified side sectional view of a fire suppression apparatus comprising a pyrotechnic generator with convergent-divergent nozzle, further including cooling media and screens, according to an embodiment of the invention.

FIG. 4 is a simplified side sectional view of a fire suppression apparatus 40, according to an embodiment of the invention, comprising a pyrotechnic generator 42, coupled directly to a C-D nozzle 44. Disposed immediately downstream of the outlet of C-D nozzle 44 is cooling media 46 and screen 48. It is believed that the advantageous effects of nozzle 44 enables the use of less robust cooling media and/or screens, thus lowering the cost and materials requirements of apparatus 40, while maintaining a satisfactory fire suppression performance. The convergent-divergent nozzle is still compatible with the solid cooling media and screens to provide further cooling and prevent flame ejection. Less cooling media would be required and the thermal shock to the cooling media would be less so the "slag" would be reduced significantly.

Figure 5:
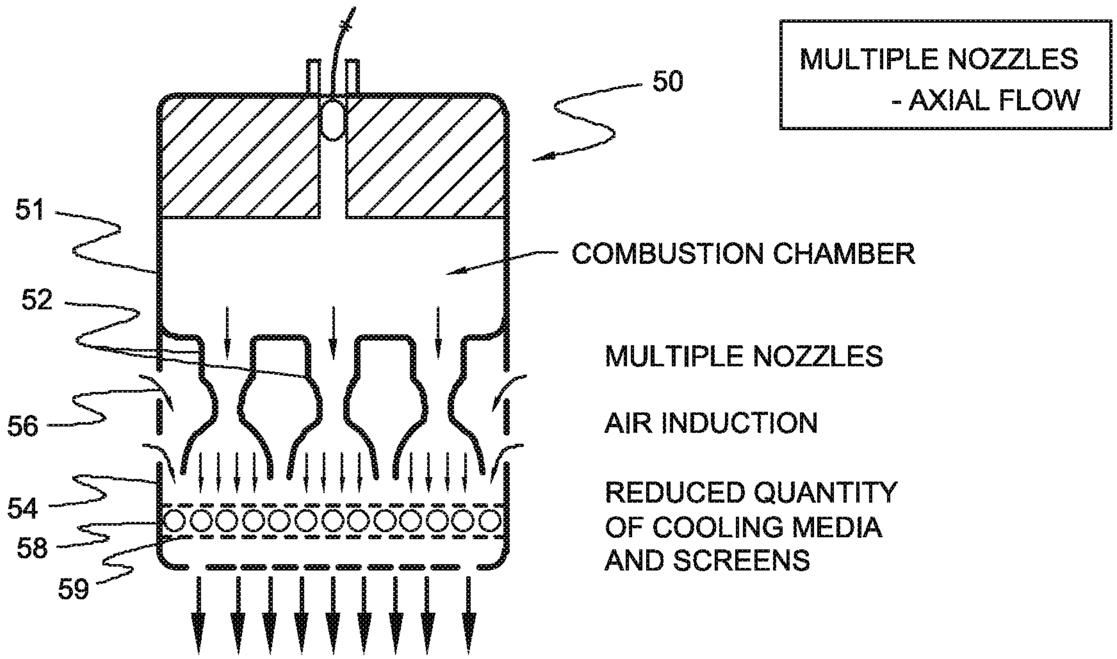
FIG. 5 is a simplified side sectional view of a fire suppression apparatus comprising a pyrotechnic generator with a plurality of convergent-divergent nozzles, further including air eduction, cooling media and screens, wherein the nozzles are arranged in a parallel, axial discharge configuration, according to an embodiment of the invention.

FIG. 5 is a simplified side sectional view of fire suppression apparatus 50, according to an embodiment of the invention, comprising a pyrotechnic generator 51, and a plurality of C-D nozzles 54 coupled directly to the combustion chamber of generator 51. In the embodiment of FIG. 5, nozzles 52 are arranged to have their respective discharges project in substantially parallel directions. Apparatus 50 further optionally includes shell 54 and apertures 56 for air induction, as previously described, and further optionally includes, as desired or necessary for the needs of a particular installation, cooling media 58 and/or screens 59.

Figure 6:
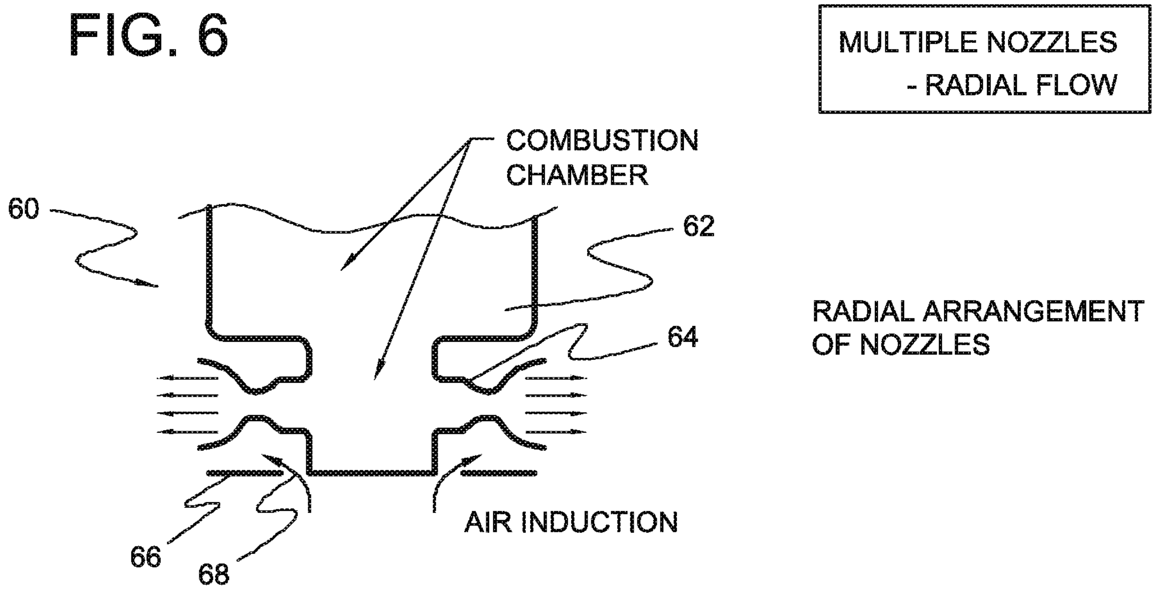
FIG. 6 is a simplified side sectional view of a fire suppression apparatus comprising a pyrotechnic generator with a plurality of radially-disposed convergent-divergent nozzles, with air eduction, according to an embodiment of the invention.

FIG. 6 is a simplified side sectional view of fire suppression apparatus 60, according to an embodiment of the invention, comprising a pyrotechnic generator 62, and a plurality of radially-disposed C-D nozzles 64 coupled directly to the combustion chamber of generator 62. Air induction may be provided in the form of a circular plate 66, having apertures 68 disposed therein. Alternatively, plate 66 and aperture 68 may both be annular in nature. In the embodiment of FIG. 6, cooling media or screens are not shown, but in alternative variations, such structures may be provided if needed, wherein the cooling media or screens would be arranged as a hoop or annular structure surrounding the periphery of the nozzle section. In a still further embodiment, not pictured, nozzles may be arranged in combinations of axial or radial arrangements, or even spherical.

Figure 7:
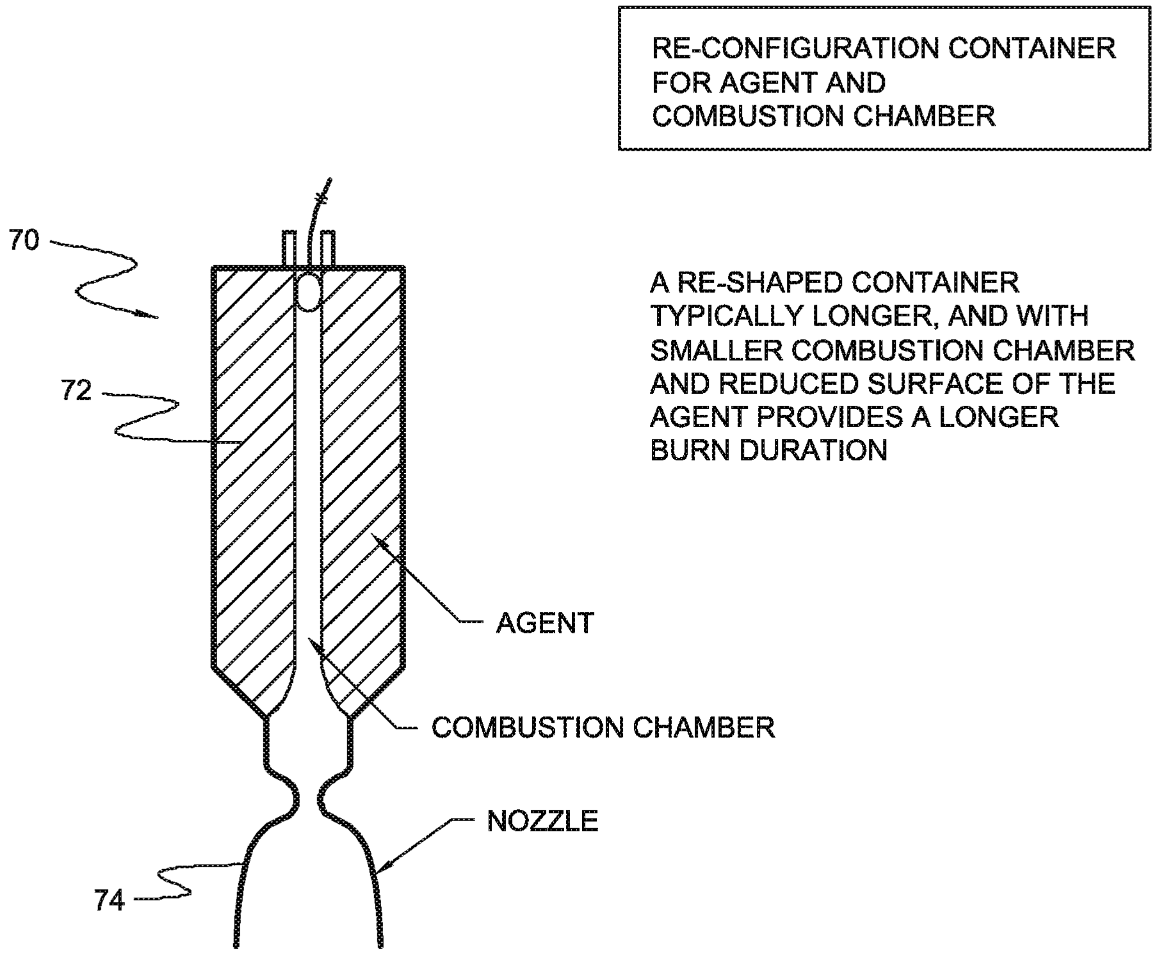
FIG. 7 is a simplified side sectional view of a fire suppression apparatus comprising a pyrotechnic generator with an elongated generator/nozzle axial discharge configuration, according to an embodiment of the invention.
Figure 8:
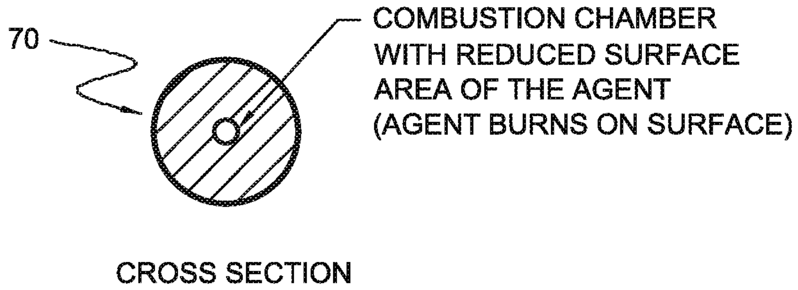
FIG. 8 is a simplified axial sectional view of the fire suppression apparatus according to the embodiment of FIG. 7.

FIG. 7 is a simplified side sectional view of fire suppression apparatus 70, having an elongated pyrotechnic generator 72 and C-D nozzle 74. FIG. 8 is a simplified axial sectional view of apparatus 70. To optimize the discharge for best mixing in the room, the increased momentum can be combined with a longer/narrower chamber to give a much longer burn time. By providing such a configuration, the burn duration of the generator can be extended for a comparable volume of reactant(s).

Figure 9:
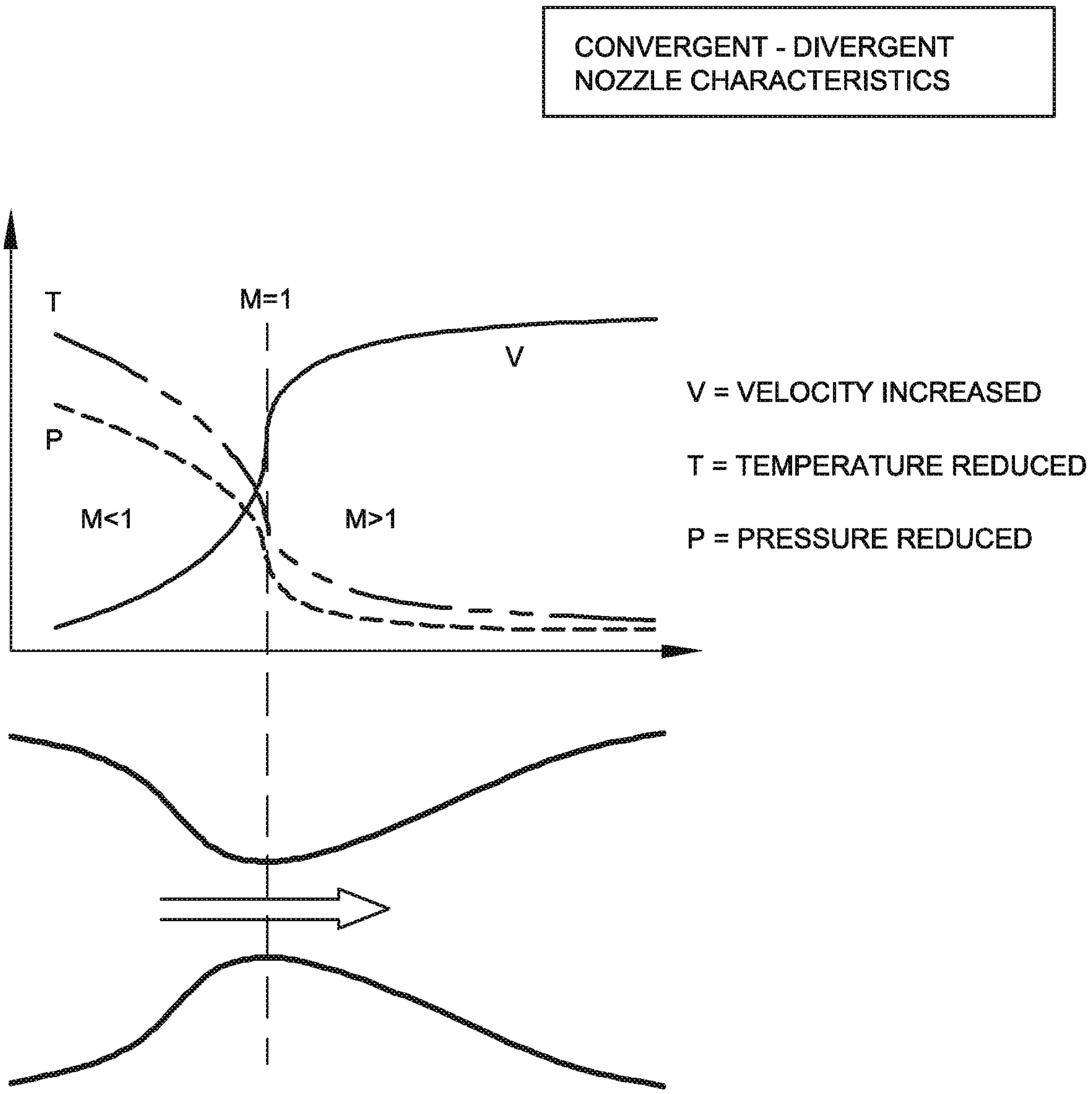
FIG. 9 is graph demonstrating various performance characteristics for convergent-divergent nozzles.

FIG. 9 is a graph illustrating various performance characteristics of C-D nozzles generally.

FIG. 10-13 discuss an alternative embodiment of the invention, wherein a pyrotechnic aerosol fire suppression agent, which may be released through exposure to heat and/or flame, is provided in the form of a body of material that is impregnated with the pyrotechnic aerosol agent, in an embodiment, in the form of sheets. Such sheets may be strategically placed on or in the vicinity of a potential fire hazard. The aerosol agent panels (sheets, coatings, etc.) would be especially suitable when there is limited space for other aerosol extinguishing systems or when there are significant obstructions to the distribution of the agent. Alternatively, the aerosol agent sheet or coating may be provided as a supplement to a pyrotechnic fire suppression agent dispersed via nozzle, as described with respect to the embodiments of FIGS. 1-9. Although the material having fire suppression agents impregnated therein is described and illustrated herein as being in the form of sheets, other geometric configurations are also possible and considered to be within the scope of this invention. Such alternative configurations of the body of impregnated material may include, but are not limited to: one of flexible, rigid, a combination thereof; and a shape that is one of a cylinder, a pyramid, a prism, a rectangular parallelepiped (such as a brick-shaped block or cube), a sphere, an irregular shell, a combination thereof; and one of hollow, solid-through, solid but porous throughout; a combination thereof.

Figure 10:
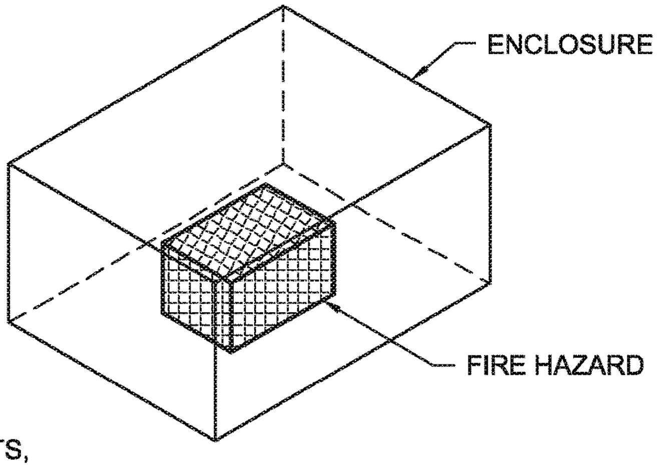
FIG. 10 is a schematic illustration of a representative enclosure in which a potential fire hazard is disposed.

FIG. 10 is a schematic illustration of a representative enclosure 80 in which a potential fire hazard 82 is disposed. The hazard to be protected may comprise, for example, a containment, which may be substantially leak-proof, which may have minor leakage, and which represents a potential fire hazard. The fire hazard is in the enclosure. The class of fire can be Class A (ordinary combustibles), Class B (flammable liquids) or class C (electrical fires), including, but not limited to, fires with energetic materials, such as battery fires or fires initiated or maintained that involve other kinds of energetic materials—many of which are not as of the time of this writing readily classified in the traditional A, B or C classifications.

Figure 11:
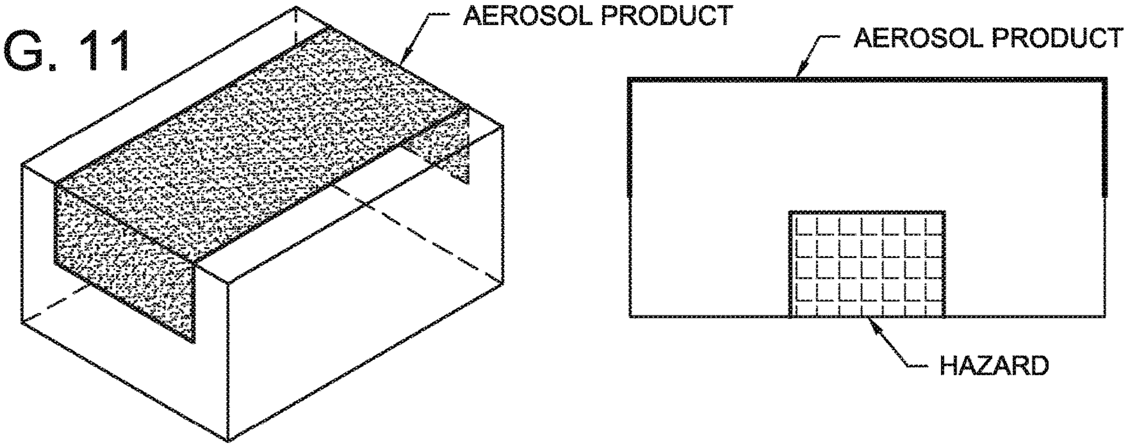
FIG. 11 is a schematic illustration of an aerosol product according to an embodiment of the invention, shown disposed on the fire hazard illustrated in FIG. 10.

FIG. 11 is a schematic illustration of an aerosol product 84 according to an embodiment of the invention, shown disposed on the fire hazard 82 illustrated in FIG. 10. Aerosol agent, formed from sheets, panels or other shapes can be fitted within the enclosure 80. The amount of agent and placement is dependent on the volume, available space, leakage, obstructions. In high energy hazards, the unwanted fire would have enough energy, flames and/or heat to initiate the combustion of the aerosol agent. In this most simple arrangement, there is no requirement for fire detection and the actuation of the fire extinguishing capability is automatic. Typical materials that may be used in the make-up of an aerosol pellet (used in a pyrotechnical generator) or on an impregnated sheet include, but are not limited to one or more of the following: potassium nitrate; potassium carbonate; epoxies or organic resins; dicyandiamide (DCDA); magnesium. When configuring a pyrotechnical generator or impregnated sheet, various factors may be taken into consideration in determining the rate of production of the fire suppressing aerosol, including but not limited to: the specific chemical composition; the surface area of the sheet or the nozzle area and/or chamber volume in the case of a generator, shape and/or thickness of a sheet or panel; the use of inhibiting coatings (on the sheet, panel or generator pellets) such as a ceramic "paint."

Figure 12:
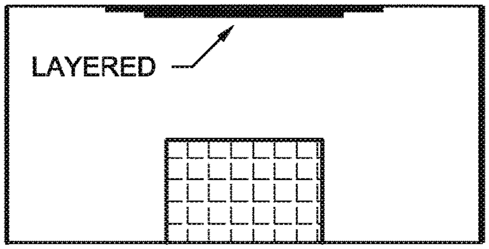
FIG. 12 is a schematic illustration of an alternative embodiment of the invention, illustrating alternative placement of aerosol product.

FIG. 12 is a schematic illustration of an alternative embodiment of the invention, illustrating alternative placement of aerosol product 84, or example as a plurality of layers 86, 88. More layers may be provided, if desired. The aerosol agent in the aerosol product 84 can be arranged to best suit the enclosure 80 and the fire hazard 82. Once initiated, all the aerosol agent will actuate because of the energy of the aerosol materials. Nearby aerosol agent will start to burn to produce the extinguishing agent even when the installed aerosol agent sheets/panels or forms are not in contact with each other. Alternatively, Further, the layers 86, 88 may be fabricated using different aerosol materials, such as might deploy at different temperatures, to suit the nature of the particular fire hazard 82 in question.

Figure 13:
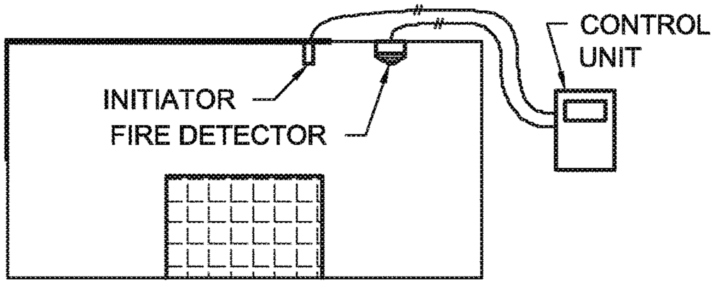
FIG. 13 is a schematic illustration of an alternative embodiment of the invention, illustrating deployment of the aerosol product in combination with detection and actuation systems.

FIG. 13 is a schematic illustration of an alternative embodiment of the invention, illustrating deployment of the aerosol product 84 in combination with detection and actuation systems. In addition to being self-initiating when there is significant flame or energy from a fire, the aerosol agent materials can be initiated by adding fire detection 92 and electric initiators 94 for use when the fire is not expected to be of the energy required to initiate the aerosol burning, or when added reliability is desired. The fire detection can use smoke, heat, flame detectors and/or manual actuation stations 90.

In addition to, or as an alternative to, using a fire detection system to actuate the fire suppression aerosol generator or sheets, actuation could also be caused by a signal received from a process monitoring system (not illustrated) provided for monitoring equipment that could potentially catch fire. For example, if a battery compartment, e.g., in a vehicle, is being protected, in addition to a dedicated fire/smoke sensor configured to send a signal to a control apparatus, in addition the battery bank could have a monitoring system that might detect faults in the operation of the battery bank that could correspond to conditions likely to lead to ignition or explosion, but prior to the existence of actual detectable smoke or flame.

These panels, shapes or coatings 84 can be applied to the ceiling/top, walls and floor/bottom of an enclosure 80, such as a battery enclosure, to disperse the agent directly into the enclosure/room once the agent is ignited.

The agent combustion that creates the extinguishing aerosol can be initiated directly by the flames or high-heat of a fire. The agent combustion can also be initiated by various fire detection systems 90, 92, 94, employing heat, smoke or flame sensors, or manual actuation stations to electrically operate an initiator fitted to the aerosol agent. Other types of initiators would be thermally actuated or mechanical types that would use the temperature increase in the compartment or manual mechanical means to operate an initiator.

While the embodiments of the invention disclosed herein are presently considered to be preferred, various changes and modifications can be made without departing from the spirit and scope of the invention. The scope of the invention is indicated in the appended claims, and all changes and modifications that come within the meaning and range of equivalents are intended to be embraced therein.

Although the invention has been described with reference to the above examples, it will be understood that many modifications and variations are contemplated within the true spirit and scope of the embodiments of the invention as disclosed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed is:

1. A fire suppression system which produces a condensed pyrotechnically-generated aerosol, comprising at least one of:

an aerosol-generating material disposed on, or in physical proximity to, a potential fire hazard;

wherein the aerosol-generating material is capable of being directly actuated solely via direct exposure to one of flame, heat above a predetermined level, combustion products in excess of a predetermined concentration, and combustion products having at least predetermined constituent;

wherein the aerosol-generating material is in the form of at least one of:

a flexible sheet impregnated with an aerosol fire suppression substance;

a rigid sheet, impregnated with an aerosol-generating material;

a coating of aerosol-generating material applied to a surface on, or in physical proximity to, the potential fire hazard;

a three-dimensional solid of aerosol-generating material having a shape in the form of at least one of a cylinder, a pyramid, a prism, a rectangular parallelepiped, a sphere, an asymmetrical shell, a combination thereof; and one of hollow, solid-through, solid but porous throughout;

or a combination thereof;

a pyrotechnic generator, which upon actuation, ignites a body of the aerosol-generating material, the aerosol-generating material capable of being directly actuated solely via direct exposure to one of flame, heat above a predetermined level, combustion products in excess of a predetermined concentration, combustion products having at least predetermined constituent, to produce a pyrotechnically-generated aerosol produces fire suppression agent, the pyrotechnic generator including a combustion chamber having an outlet and at least one convergent-divergent nozzle coupled directly to the outlet of the combustion chamber, the nozzle disposed so as to direct the aerosol fire suppression agent at the potential fire hazard.

2. A fire suppression system which produces a condensed pyrotechnically-generated aerosol, comprising:

an aerosol-generating material disposed on, or in physical proximity to, a potential fire hazard, wherein the aerosol-generating material is capable of being directly actuated solely via direct exposure to one of flame, heat above a predetermined level, combustion products in excess of a predetermined concentration, combustion products having at least predetermined constituent;

wherein the aerosol-generating material is configured to be actuated by exposure to at least one of heat or flame, to produce an aerosol having components having a greater affinity for combination with fire fuel chemical components than an affinity for ambient oxygen to combine with fire fuel chemical components, to produce chemical components having a lesser tendency to combust;

wherein the aerosol-generating material is in the form of at least one of: a body of material one of fabricated of, or impregnated with, an aerosol-generating fire suppression substance, a coating fabricated of an aerosol-generating fire suppression substance, fixedly applied to a surface onto at least one of the potential fire hazard, a containment for the potential fire hazard.

3. The fire suppression system according to claim 2, wherein the body of aerosol-generating material is one of flexible, rigid, a combination thereof; and has a shape that is one of a cylinder, a pyramid, a prism, a rectangular parallelepiped, a sphere, an asymmetrical shell, a combination thereof; and is one of hollow, solid-through, solid but porous throughout; a combination thereof.

4. The fire suppression system according to claim 2, wherein the aerosol-generating fire suppression substance comprises at least one of potassium nitrate; potassium carbonate; epoxies or organic resins; dicyandiamide (DCDA); magnesium.

5. The fire suppression system according to claim 2, wherein the aerosol material further comprises:

a plurality of layers of aerosol fire suppression substance.

6. The fire suppression system according to claim 5, wherein the plurality of layers comprises at least two layers, and further wherein the aerosol-generating fire suppression substance of a first layer is different from an aerosol-generating fire suppression substance of a second layer.

7. The fire suppression system of claim 2, further comprising:

an initiator operably coupled to the aerosol-generating material to facilitate actuation of the aerosol-generating material.

8. The fire suppression system of claim 7, further comprising:

a fire detector operably coupled to the initiator, to actuate the initiator, upon detection of at least one of heat in excess of a predetermined temperature, flame, combustion products in excess of a predetermined concentration, combustion products having at least predetermined constituent.

9. The fire suppression system of claim 7, further comprising:

a control apparatus coupled to the initiator and the aerosol material.

10. The fire suppression system of claim 9, wherein the control apparatus comprises a manual actuator to enable the initiator to be selectively actuated by a person.

11. The fire suppression system according to claim 9, further comprising:

a fire detector operably coupled to the initiator, and the control apparatus, to actuate the initiator, upon detection of at least one of heat in excess of a predetermined temperature, flame, combustion products in excess of a predetermined concentration, combustion products having at least predetermined constituent.

12. The fire suppression system according to claim 9, wherein the fire hazard comprises at least one of a device and a process system, and the control apparatus is coupled to a monitoring apparatus that monitors operation of the device.

13. A fire suppression apparatus which produces a condensed pyrotechnically-generated aerosol, comprising:

a pyrotechnic generator, which upon actuation, produces an aerosol fire suppression agent, the pyrotechnic generator including a combustion chamber having an outlet;

at least one convergent-divergent nozzle coupled directly to the outlet of the combustion chamber;

an aerosol-generating material producing the pyrotechnically-produced aerosol fire suppression agent, wherein the aerosol-generating material is capable of being directly actuated solely via direct exposure to one of flame, heat above a predetermined level, combustion products in excess of a predetermined concentration, combustion products having at least predetermined constituent, the fire suppression agent having components having a greater affinity for combination with fire fuel chemical components than an affinity for ambient oxygen to combine with fire fuel chemical components, to produce chemical components having a lesser tendency to combust.

14. The fire suppression apparatus according to claim 13 further comprising:

an air induction shell coupled to the pyrotechnic generator and surrounding the at least one convergent-divergent nozzle, the air induction shell having at least one aperture therein, through which surrounding environmental air is educted and entrained in a discharge flow emanating from the at least one convergent-divergent nozzle.

15. The fire suppression apparatus according to claim 13 further comprising:

at least one cooling medium disposed downstream from an outlet of the at least one convergent-divergent nozzle.

16. The fire suppression apparatus according to claim 13 further comprising:

a screen disposed downstream from an outlet of the at least one convergent-divergent nozzle.

17. The fire suppression apparatus according to claim 13, wherein the at least one convergent-divergent nozzle further comprises a plurality of convergent-divergent nozzles.

18. The fire suppression apparatus according to claim 17, wherein the convergent-divergent nozzles are disposed in a direction parallel to an axis of a discharge outlet of the pyrotechnic generator and project their collective discharges in a substantially axial direction, substantially parallel to one another.

19. The fire suppression apparatus according to claim 17, wherein the convergent-divergent nozzles are disposed circumferentially about an axis of a discharge outlet of the pyrotechnic generator and extend radially outwardly therefrom, and project their respective discharges radially relative to the axis.

20. The fire suppression apparatus according to claim 13, wherein at least one convergent-divergent nozzle is disposed in a direction parallel to an axis of a discharge outlet of the pyrotechnic generator and projects its discharge in a predominantly axial direction, and at least one convergent-divergent nozzle is disposed so that it extends radially outwardly from an axis of the discharge outlet, and projects its discharge radially relative to the axis.

21. The fire suppression apparatus according to claim 13, wherein the convergent-divergent nozzles are disposed in at least one of a direction parallel to an axis of a discharge outlet of the pyrotechnic generator and project their collective discharges in a substantially axial direction, substantially parallel to one another, and circumferentially about an axis of a discharge outlet of the pyrotechnic generator and extend radially outwardly therefrom, and project their respective discharges radially relative to the axis.

* * * * *